US011826960B2

(12) United States Patent
Moosberg

(10) Patent No.: US 11,826,960 B2
(45) Date of Patent: Nov. 28, 2023

(54) THREE-DIMENSIONAL IMAGING APPARATUS HAVING MULTIPLE PASSIVE NOZZLES FOR MODELING A MULTI MATERIAL THREE-DIMENSIONAL OBJECT

(71) Applicant: EMEMO SOLUTIONS AB, Torslanda (SE)

(72) Inventor: Mats Moosberg, Torslanda (SE)

(73) Assignee: EMEMO SOLUTIONS AB, Torslanda (SE)

( * ) Notice: Subject to any disclaimer, the term of this patent is extended or adjusted under 35 U.S.C. 154(b) by 0 days.

(21) Appl. No.: 17/370,113

(22) Filed: Jul. 8, 2021

(65) Prior Publication Data

US 2022/0009169 A1    Jan. 13, 2022

Related U.S. Application Data

(60) Provisional application No. 63/049,789, filed on Jul. 9, 2020.

(51) Int. Cl.
| | | |
|---|---|---|
| *B29C 64/336* | (2017.01) | |
| *B29C 64/386* | (2017.01) | |
| *B29C 64/118* | (2017.01) | |
| *B29C 64/209* | (2017.01) | |
| *B33Y 10/00* | (2015.01) | |
| *B33Y 30/00* | (2015.01) | |

(Continued)

(52) U.S. Cl.
CPC .......... *B29C 64/336* (2017.08); *B29C 64/118* (2017.08); *B29C 64/209* (2017.08); *B29C 64/295* (2017.08); *B29C 64/386* (2017.08); *B33Y 10/00* (2014.12); *B33Y 30/00* (2014.12); *B33Y 50/00* (2014.12)

(58) Field of Classification Search
CPC ... B29C 64/336; B29C 64/118; B29C 64/209; B29C 64/295; B29C 64/386; B33Y 30/00
See application file for complete search history.

(56) References Cited

U.S. PATENT DOCUMENTS

| | | | | |
|---|---|---|---|---|
| 2017/0232674 | A1* | 8/2017 | Mark | B29C 31/042 |
| | | | | 264/308 |
| 2019/0047099 | A1* | 2/2019 | Guo | B29C 64/209 |
| 2021/0347115 | A1* | 11/2021 | Fetfatsidis | B29C 64/40 |

FOREIGN PATENT DOCUMENTS

| | | | |
|---|---|---|---|
| CN | 106493944 A | * | 3/2017 |
| KR | 101849592 B1 | * | 5/2016 |

* cited by examiner

*Primary Examiner* — Joseph S Del Sole
*Assistant Examiner* — Mohamed K Ahmed Ali
(74) *Attorney, Agent, or Firm* — Kagan Binder, PLLC

(57) ABSTRACT

The present invention relates to a three dimensional imaging apparatus (3D printer) having a print head unit with multiple passive micro-sized nozzles, wherein the passive micro-sized nozzles are also integrated with material interfaces. The print head unit comprises a nozzle gripper mechanism for picking said passive micro-sized nozzle, a filament or rod feeding mechanism for feeding the material, and a heating mechanism arranged for contactless heating regulating of the lower portion of said passive micro-sized nozzle. A method for printing a three-dimensional object of multi-materials by using an innovative three dimensional imaging apparatus having a print head with multiple passive nozzles is also disclosed. The three-dimensional imaging apparatus is capable of providing different types of materials as well as different color of the materials for creating three-dimensional object.

17 Claims, 8 Drawing Sheets

(51) Int. Cl.
*B29C 64/295* (2017.01)
*B33Y 50/00* (2015.01)

THREE-DIMENSIONAL IMAGING APPARATUS HAVING MULTIPLE PASSIVE NOZZLES FOR MODELING A MULTI MATERIAL THREE-DIMENSIONAL OBJECT

CROSS REFERENCE TO RELATED APPLICATIONS

This application is a non-provisional application and, claims the benefit under 35 U.S.C. 119 (e) of U.S. provisional application No. 63/049,789 filed on Jul. 9, 2020 and hereby incorporated by reference in their entireties into this application

FEDERALLY SPONSORED RESEARCH AND DEVELOPMENT

Not applicable.

MICROFICHE

Not applicable

FIELD OF THE INVENTION

The present invention generally relates to the field of three dimensional printing. The invention, particularly relates to a three-dimensional imaging apparatus for modeling a multi-material three-dimensional object on a layer-by-layer basis comprising an arrangement for supplying multiple filament materials on a rack arrangement for holding a plurality of passive micro-sized nozzles a print head unit; a printer holding frame a gantry motion system, and a build platform. A method for printing a three-dimensional object of multi-materials using three dimensional imaging apparatus is also disclosed.

BACKGROUND OF THE INVENTION 3D printers are used to build solid models by performing layer by layer printing of building material. The building material can be of the different forms, such as liquid, semiliquid at the 3D print-head, for example, a solid material can be heated and then extruded from a 3D printer nozzle. The layers of building materials can be solidified on a substrate. 3D printer systems can use a fused filament fabrication (FFF) process (sometimes called fused deposition modeling (FDM) process) in which a filament is moved by a filament moving mechanism, toward a heated zone. The filament can be melted, and extruded on a platform to form a 3D object. A commercially available FFF system uses a heated nozzle to extrude a melted material like a plastic wire. The starting material is in the form of a filament which is being supplied from a spool. The filament is introduced into a flow passage of the nozzle and is driven to move like a piston inside this flow passage. The front end, near the nozzle tip, of this piston is heated to become melted. The rear end or solid portion of this piston pushes the melted portion forward to exit through the nozzle tip. The nozzle is translated under the control of a computer system in accordance with previously generated CAD data sliced into constituent layers.

A number of different types of compositions for three dimensional printing are available in prior art. For example, the following patents are provided for their supportive teachings and are all incorporated by reference: U.S. Pat. No. 5,121,329 discloses an apparatus for making three-dimensional physical objects of a predetermined shape by sequentially depositing multiple layers of solidifying material on a base member in a desired pattern. The reference does not appear to disclose the printhead having multiple nozzles.

Another prior art document, EP2772347A1 discloses a head assembly for an extrusion-based 3D printer includes: a fluid-dispensing head having a manifold and at least two fluid-dispensing nozzles, as of different sizes, which are mounted in communication with a melt chamber in a manifold. Outlets of the nozzles are each closed by a respective valve member. However, the reference does not appear to disclose print-head for supplying either filament or solid material.

Yet another prior art document, CN105291436A discloses a double-wire printing head of a 3D printer and a switching control method of the double-wire printing head. The technical problem that when an existing double-wire printing head carries out printing, two printing heads interfere with each other is solved. The double-wire printing head comprises a wire feeding device and two printing head bodies. The wire feeding device comprises a wire feeding mechanism and a switching mechanism. The wire feeding mechanism comprises a wire guiding pipe base, a left wire feeding pressing wheel, a right wire feeding pressing wheel, a drive wire feeding wheel, a wire guiding pipe, a fixing plate, a pre-tightening spring and a wire feeding motor. The switching mechanism comprises a rotating plate, a switching connecting rod, a push rod and two pressing wheel swing arms. However, this prior art document does not appear to discuss a three-dimensional printer having one print-head connected with multiple nozzles.

Yet another prior art document, WO2018122390A1 discloses a filament feeding mechanism for a 3D printer head for selectively feeding filaments, comprising a motor wheel for feeding filaments, and a set of pinch rollers mounted on a rocker arm. It further comprises a pushrod connected to the rocker arm, and in that the rocker arm is pivotably mounted with the axis of rotation and adopted to rotate by lateral motion of pushrod to press one of the pinch rollers to the respective filament. However, this prior art document does not appear to discuss a three-dimensional printer having one print-head connected with multiple nozzles.

Yet another prior art document, WO2007130229A2 discloses an extrusion head comprising at least one drive wheel and an assembly positionable between at least a first state and a second state. The assembly comprises a first extrusion line configured to engage the at least one drive wheel while the assembly is positioned in the first state, and a second extrusion line configured to engage the at least one drive wheel while the assembly is positioned in the second state. However, this prior art document does not appear to discuss a three-dimensional printer having one print-head connected with more than three nozzles.

Yet another prior art document, U.S. Pat. No. 8,827,684B1 discloses a fused filament fabrication printer has a fixed extrusion module having multiple printheads having print tips. The fixed arrangement of the printing heads allows the close spacing of multiple print tips in a printhead unit, and the simple routing of multiple plastic or metal filaments to the individual printing heads. The closely spaced print tips in the printhead unit share common components. An exemplary printhead unit has four printing heads which share a common heating block and heating block temperature sensor. However, this prior art document does not appear to discuss 3D printing system having a single print-head with multiple nozzles.

Yet another prior art documents, WO2016149032A1 discloses a printhead for 3D printing of multiple materials comprises a nozzle body including at least two ink delivery channels joined together at a downstream end of each channel and comprising a single outlet, a transition channel having an inlet connected to the single outlet of the ink delivery channels, where the transition channel comprises a width d2, and an expansion channel having an inlet connected to an outlet of the transition channel, where the expansion channel has a width d3 greater than the width d2. The expansion channel also includes an outlet for extrusion there through of a continuous filament comprising more than one material. However, this prior art document do not appear to discuss the 3D printing system having a single print-head with multiple nozzles.

However, above mentioned references and many other similar references has one or more of the following shortcomings: (a) multiple print heads; (b) complex structure of 3D-printer; (c) limited number of materials simultaneously can be used; (d) there are many examples of 3d printers with, multiple print heads where an automatic or manual pick up function can switch between heads, but due to that each print head needs an electrical interface, heaters and feeding mechanisms; (e) print head are bulkier and heavy; and (f) further there are also examples of 3d printer with a print head with interchangeable nozzles but they require manual intervention also hindering efficient multiple material printing.

The present application addresses the above mentioned concerns and short comings with regard to providing a three dimensional printing system comprising a single print head and multiple passive nozzles and a solution for pick up and heating of the passive nozzles.

SUMMARY OF THE INVENTION

In the view of the foregoing disadvantages inherent in the known types of for three dimensional printing now present in the prior art, the present invention provides a three-dimensional imaging apparatus for modeling a multi-material three-dimensional object on a layer-by-layer basis. As such, the general purpose of the present invention, which will be described subsequently in greater detail, is to provide an innovative three-dimensional printer for printing a three-dimensional object using multi-materials. which has all the advantages of the prior art and none of the disadvantages.

The main objective of the present invention is to provide A three-dimensional imaging apparatus for modeling a multi-material three-dimensional object on a layer-by-layer basis in accordance with a computer aided design (CAD) image of said object, comprising: a printer holding frame; a gantry motion system; a print head unit, wherein said print head unit is fixed on said gantry motion system; an arrangement for supplying multiple filament materials; a rack arrangement for holding a plurality of passive micro-sized nozzles, wherein each passive micro-sized nozzle pre-loaded with a material; a build platform on which said object is formed; wherein said print head unit comprises a nozzle gripper mechanism for picking said passive micro-sized nozzle, a filament or rod feeding mechanism for feeding the material, and a heating mechanism arranged for contactless heating regulating of the lower portion of said passive micro-sized nozzle.

Another objective of the present invention is to provide the three-dimensional imaging apparatus for modeling a multi-material three-dimensional object, wherein each passive micro-sized nozzle is configured to hold a filament or a rod of said material.

Yet another objective of the present invention is to provide the three-dimensional imaging apparatus for modeling a multi-material three-dimensional object, wherein said material is selected from the group of thermoplastic polymer materials.

Yet another objective of the present invention is to provide the three-dimensional imaging apparatus for modeling a multi-material three-dimensional object, wherein said print head unit is configured to pick said passive micro-sized nozzle from said rack arrangement for printing and to place back said passive micro-sized nozzle after printing.

Yet another objective of the present invention is to provide the three-dimensional imaging apparatus for modeling a multi-material three-dimensional object, wherein said passive micro-sized nozzle having an entry point for filament material at the top and a nozzle tip at the bottom.

Yet another objective of the present invention is to provide the three-dimensional imaging apparatus for modeling a multi-material three-dimensional object, wherein said nozzle tip is selected from the group consisting of inductive material and metallic material.

Yet another objective of the present invention is to provide the three-dimensional imaging apparatus for modeling, a multi-material three-dimensional object, wherein said metallic material having a magnetic and/or inductive properties.

Yet another objective of the present invention is to provide the three-dimensional imaging apparatus for modeling a multi-material three-dimensional object, wherein said nozzle gripper mechanism comprises a nozzle gripper arm, a release arm, and a release motor.

Yet another objective of the present invention is to provide the three-dimensional imaging apparatus for modeling a multi-material three-dimensional object, wherein said nozzle gripper arm comprises a mating surface, a fixating ball point, a plurality of fixating points, and a pivot point.

Yet another objective of the present invention is to provide the three-dimensional imaging apparatus for modeling a multi-material three-dimensional object, wherein said filament or rod feeding mechanism comprises a filament feeder pressure arm, a filament feeder wheel, and a filament feeder motor.

Yet another objective of the present invention is to provide the three-dimensional imaging apparatus for modeling a multi-material three-dimensional object, wherein said heating mechanism comprises a heating element and a sensor.

Yet another objective of the present invention is to provide the three-dimensional imaging apparatus for modeling a multi-material three-dimensional object, wherein said heating element is an induction heating element.

Yet another objective of the present invention is to provide the three-dimensional imaging apparatus for modeling a multi-material three-dimensional object, wherein said heating mechanism further comprises a contactless heat sensor.

Yet another objective of the present invention is to provide the three-dimensional imaging apparatus for modeling a multi-material three-dimensional object, wherein said heating mechanism further comprises an infrared contactless heat sensor.

Yet another objective of the present invention is to provide the three-dimensional imaging apparatus for modeling a multi-material three-dimensional object, wherein said passive micro-sized nozzle comprises a proximal end having a nozzle fixation mechanical interface.

Yet another objective of the present invention is to provide the three-dimensional imaging apparatus for modeling a multi-material three-dimensional object, wherein said passive micro-sized nozzle further comprises a surface, wherein said surface is positioned to allow temperature sensing between said sensor and said nozzle tip.

Yet another objective of the present invention is to provide the three-dimensional imaging apparatus for modeling a multi-material three-dimensional object, wherein said fixating ball point is configured to engage with said mating surface on said passive micro-sized nozzle after it is placed against said fixating points.

Another main objective of the present invention is to provide A method for printing a three-dimensional object of multi-materials, wherein said method comprising the following steps: (i) Preloading a plurality of materials on a plurality of passive micro-sized nozzles, wherein each said material is pre-loaded on said passive micro-sized nozzle; (ii) Assigning a material identification code to respective said passive micro-sized nozzle in the user interface of a slicer application or in the computer interface; (iii) Creating an image of said three-dimensional object of multi-materials by a computer aided design (CAD) tool where each material in the multi-material object is correlated to the identification code; (iv) Preparing data for three dimensional printing by said slicer application or by said computer interface based on the information received from step (ii) and (v) Communicating said data for said three dimensional printing object from said slicer application or by said computer interface to a three-dimensional printer; (vi) Printing a first portion of a layer by picking the required said passive micro-sized nozzle with preloaded material according to the identification code from a rack arrangement by a print head, wherein heating of a nozzle tip with contactless heating and temperature was sensed with contactless temperature sensor; (vii) Placing back said passive micro-sized nozzle to said rack arrangement by said print head; (viii) Repeating step (vi) and (vii) for printing one layer of the said three-dimensional object by layer-by-layer basis; (ix) Repeating step (viii) for printing all layers of the said three-dimensional object by layer-by-layer basis; and (ix) Removing finally prepared said three-dimensional object of multi-materials from said three-dimensional printer.

BRIEF DESCRIPTION OF THE DRAWINGS

The invention will be better understood and objects other than those set forth above will become apparent when consideration is achieved to the following detailed description thereof. Such description makes reference to the annexed drawings wherein.

DETAILED DESCRIPTION OF THE INVENTION

Figure 1:
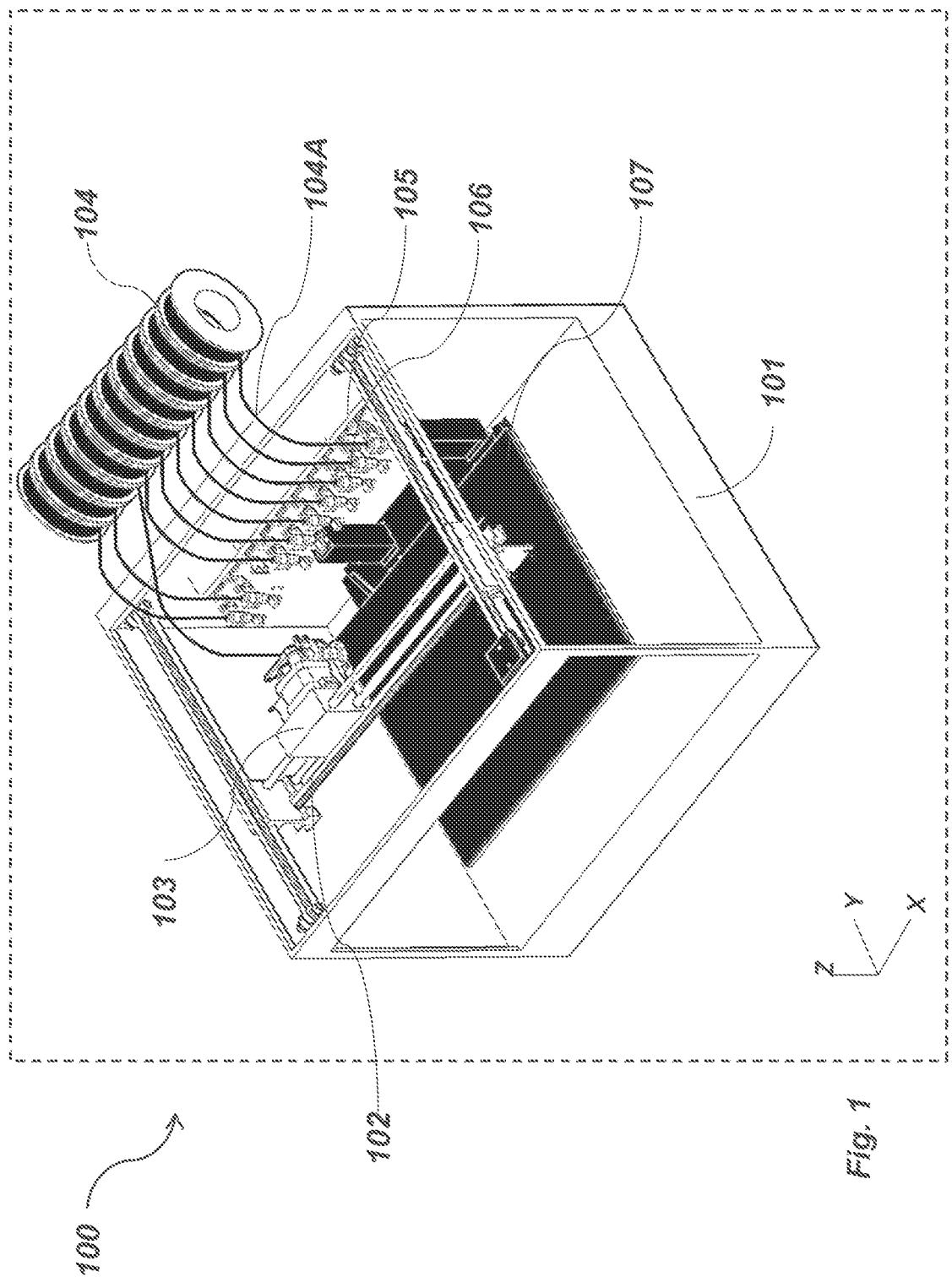
FIG. 1 depicts a schematic representation of the 3D-printer comprising the print head and multiple passive micro-sized nozzles placed on a rack, where each passive nozzle is pre-loaded with a supply of material, in accordance with the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like. As used herein, the terms "for example", "like", "such as", or "including" are, meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition and persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Three-dimensional printing is a process of constructing 3D objects from digitized files. In this process, a 3D object is designed using SolidWorks, AutoCAD, and Z-Brush, which are some examples of popular CAD software used commercially. Meshmixer, SketchUP, Blender, and FreeCAD, are some examples of the freeware commonly used to make 3D objects. These 3D objects are saved in a 3D printer-readable file format. The most common universal file formats used for 3D printing are STL (stereolithography) and VRML (virtual reality modeling language). Additive manufacturing file format (AMF), GCode, and x3 g are some of the other 3D printer readable file formats. In additive manufacturing; material is laid in layer-by-layer fashion in the required shape, until the object is formed. Although the term 3D printing is used as a synonym for additive manufacturing, there are several different fabricating processes involved in this technology. Depending on the 3D printing process, additive manufacturing can be classified into four categories, including extrusion printing, material sintering, material binding, and object lamination.

Multi-material 3D printing is the additive manufacturing procedure of using multiple materials at the same time to fabricate an object. Similar to single material additive manufacturing it can be realized through methods such as FFF, SLA and Inkjet (material jetting) 3D printing. By expanding the design space to different materials, it establishes the possibilities of creating 3D printed objects of different color or with different material properties like elasticity or solubility. The first multi-material 3D printer Fab@Home became publicly available in 2006. The concept was quickly adopted by the industry followed by many consumer ready multi-material 3D-printers. There are different technologies are used for multi-material 3D printing, such as fused filament fabrication (FFF), single nozzle design, multi-nozzle design, stereo lithography, binder jetting, and material jetting.

The need for a low cost 3d printer for additive manufacturing in multiple material and/or multiple colors is strong. The demand for innovative three-dimensional imaging apparatus is for creating the industrial design and engineering prototyping. Further, for use in medical applications where a surgical procedure can be planned beforehand by use of a 3d printed patient specific model with multiple materials and multiple colors emulating different organic materials. The surgical procedure can also be practiced beforehand by performing the procedure on a 3d printed patient specific model with multiple materials and multiple colors emulating different organic materials. There is also a need for multiple materials and color to enable more widespread use of 3d printing at the consumer level, making it possible to produce more types of objects at your home instead of consuming mass produced objects. One application can be a low cost multiple material, multiple colors 3d printer connected to a game console, where the user can 3d print high quality game characters and game medals in game. The game producer can supply materials in accurate game colors and structure enabling the printed object to be very close in color and feel to the intended game original. The present invention relates to a three-dimensional imaging apparatus having multiple passive nozzles for modeling a multi material three-dimensional object. The three-dimensional imaging apparatus is of low cost as compared to the apparatus available in the market. The three-dimensional imaging apparatus of the present invention provides solution for all the industries or examples given above.

FIG. 1 depicts a schematic representation of the 3D-printer comprising the print head and multiple microsized passive nozzles placed on a rack, where each passive nozzle is pre-loaded with a supply of material, in accordance with the present invention. The 3D-printer 100 comprising a printer holding frame 101, a gantry motion system 102, a print head unit 103, an arrangement for supplying multiple filament materials 104, a plurality of multiple filaments 104A, a rack arrangement 105 for a plurality of passive micro-sized nozzles 106 which are devoid of electrical connectors, and a build platform 107. The 3d printer will build the object by moving the print head unit 103 in X-Y plane and extrude heated material to form a layer of the object onto the build plate 107 and sequentially displacing the print head unit 103 and the build plate 107 in a third direction (Z direction) orthogonal to the X-Y plane to build the object in a layer by layer manner. The print head unit 103 is attached on the gantry motion system 102, the said gantry motion system moves in the X-Y direction. The print head unit 103 can move in X and Y direction by means of gantry motion system 102. The print head is moving to the correct position to pick up the passive nozzle assigned to the current material needed for printing. The print head unit is configured to pick said passive micro-sized nozzle 106 from said rack arrangement 105 for printing and to place back said passive micro-sized nozzle 106 after printing. The rack arrangement 105 is configured to hold plurality of passive microsized nozzles 106. The supply of filaments 104 is configured to supply material of different types and/or color in filament form. Each material is pre-loaded loaded into the filament entry point of a passive nozzle on the nozzle rack 105. In one embodiment the inductive heating is constructed with an open coil geometry enabling the passive nozzle to be attached and removed with only movement in XY plane. In one embodiment the nozzles have needle type geometry to enable printing multiple layers with one material before switching to next material. In one embodiment the nozzles have an orifice at an angle, and there is a mechanism for rotating the nozzles enabling printing of more overhangs without need for support structures. The material(s) used for a multi-material three-dimensional object is selected from the group of thermoplastic polymers, where the materials can differentiate in properties such as color, transparency, softness, surface shine and material chemical composition. In an embodiment, it can be combination of a wood-like thermoplastic combined with a metal like thermoplastic material. In an alternate embodiment, the materials used for preparing three-dimensional object can be a combination of a soft material with a stiff material, for example soft TPU thermoplastic combined with stiff PLA thermoplastic.

Figure 2:
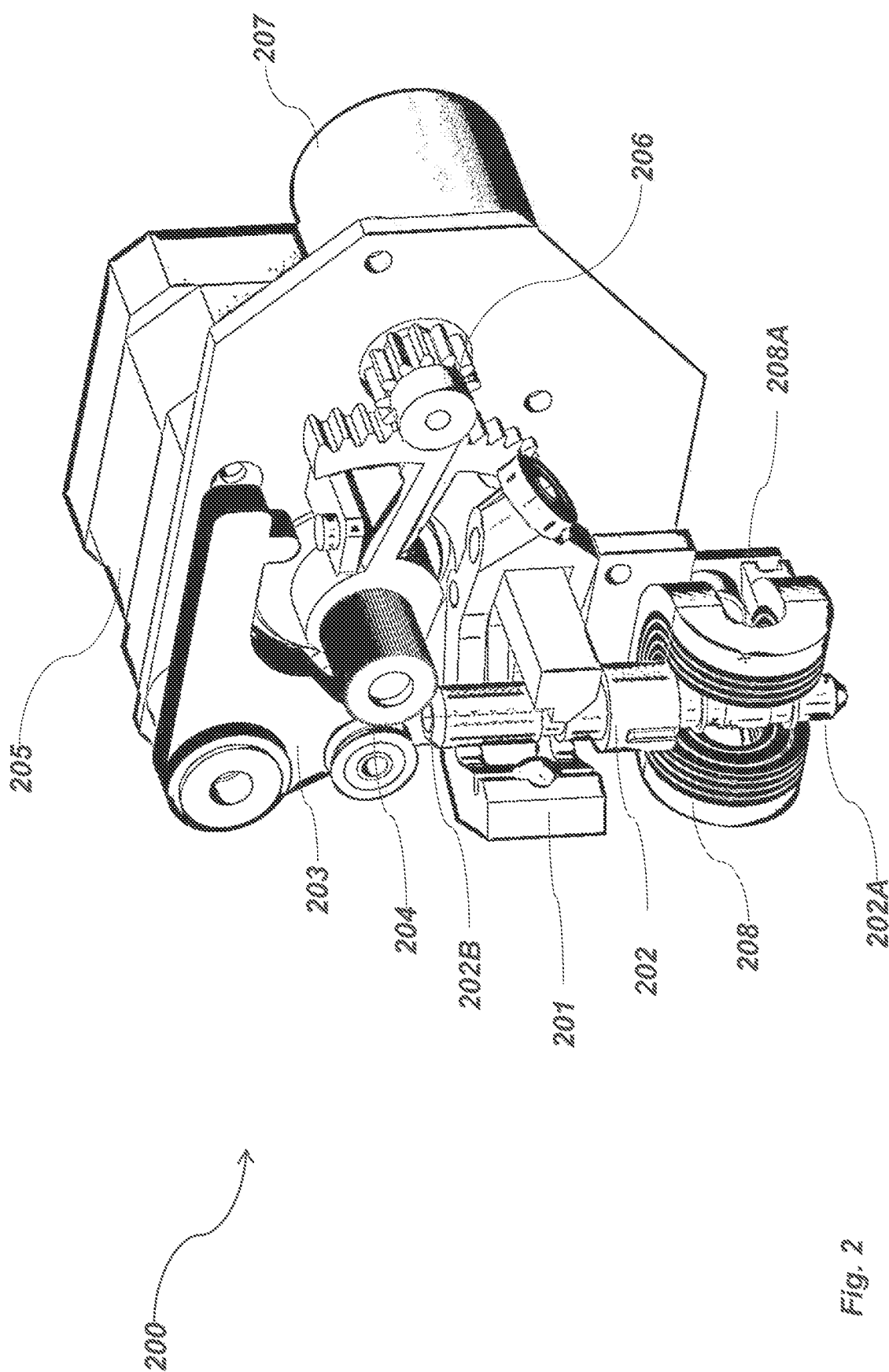
FIG. 2 depicts a schematic representation of the print head of the apparatus with one passive micro-sized nozzle attached in accordance with the present invention.

FIG. 2 depicts a schematic representation of the print head with one passive micro-sized nozzle attached in accordance with the present invention. The print head unit 200 comprising a passive micro-sized nozzle 202, a nozzle gripper mechanism for selectively picking, holding and releasing said passive micro-sized nozzle, a filament feeding mechanism arranged adjacent to and above said nozzle gripper mechanism for feeding the material, and a heating mechanism arranged adjacent to and below said nozzle gripper mechanism for contactless heating regulating of the lower portion of said passive micro-sized nozzle. The nozzle gripper mechanism comprises a nozzle gripper arm 201, a release arm 206, and a release motor 207. The filament or rod mechanism comprises a filament feeder pressure arm 203, a filament feeder wheel 204, and a filament feeder motor 205. The heating mechanism comprises a heating element 208 and a sensor 208A. The heating element 208 is capable to contactless heat the electrically conducting nozzle tip 202A by electromagnetic induction without contact. The heating element is induction heating element to provide the heating without contact (contactless). The nozzle gripper arm 201 is configured to fixate the micro-sized nozzle at a position in space by utilizing a 3 point fixture designed to exactly constrain the part in question, providing precision and certainty of location. The passive micro-sized nozzle 202 is capable of mating with the gripper, and includes an entry point for filament material. The passive microsized nozzle 202 having an entry point for filament material at the top 202B and a nozzle tip 202A at the bottom. The print head unit 200 comprises a sensor. The sensor can be a heat senor, which is particularly of infrared heat sensor 208A. Further the heating element (i.e., contactless induction heating element) 208 uses and infrared heat sensor 208A for contactless regulating of the heating of the passive micro-sized nozzle 202. The nozzle tip 202A can be made up from inductive material or metallic material. The metallic material can possess magnetic, and/or inductive properties. The filament feeding mechanism is responsible for feeding filament in to the passive micro-sized nozzle with the help of its components. The filament feeder pressure arm 203 and the filament feeder wheel 204 are used for feeding the filament (filament not shown here). The release arm 206 of the nozzle gripper mechanism is configured to grip and release the nozzle, and gripping & releasing the filament by mechanically simultaneously pushing the filament feeder arm 203 and the nozzle gripper arm 201 when rotated by the grip/release motor 207. The print head also comprises two different motors, the filament feeder motor 205 is capable of driving the feeder wheel while the release motor 207 is used for gripping and releasing nozzle & filament. The material used in the present invention, can be a combination of a soft material with a stiff material. The material is selected from the group of thermoplastic polymer materials.

In one of the embodiments there is a passive print smoothing nozzle with a spherical shape that can after printing a complete layer smooth the outer surfaces of the layer my moving in a pattern creating an ironing function. The spherical shape enables smoothing of surface of all inclinations.

Figure 3:
FIG. 3 represents the flow chart of the method of manufacturing 3D object using the print head in accordance with the present invention.

FIG. 3 represents the flow chart of the method of manufacturing 3D object using the print head in accordance with the present invention. To start the manufacturing process, the user starts the slicer application (step 301). In next step 302, the user preloads the required materials into the individual micro-sized nozzles on the rack of the 3D-printer. The user assigns a material identification code to respective said passive micro-sized nozzle in the user interface of a slicer application or in the computer interface (step 303). In next step 304, the user creates an image of said three-dimensional object of multi-materials by a computer aided design (CAD) tool or the slicer application, further while designing in the CAD tool each material in the multi-material object is correlated to the identification code. In step 305, the user prepares the data for three dimensional printing by said slicer application or by said computer interface based on the information received from step 303 and 304. The said data communicated to the three-dimensional printer (step 306). The three-printer application (3D printer application) further analyzes the data for 3D-printing from the chosen multi-material model. In next step 307, the 3D-printer picks up the correct nozzle, with preloaded material according to the identification code, from a rack arrangement for printing a first portion of a layer and extrude the material in that layer. The extrusion performed by heating without contact (means contactless) a nozzle tip by a heating element. The print head places back the passive micro-sized nozzle to the rack arrangement (step 308). In case, more materials required to complete the first portion of the layer. Further, the steps 307 and 308 are repeated by picking the micro-sized nozzles and placing them back to the rack and printing first layer of the 3D object by a layer-by-layer basis (step—309). Then repeating step 309, for printing all layers of the said three-dimensional object by layer-by-layer basis (step 310). The 3D-printer will repeat until all layers are done and 3D-object is printed. Finally, the user can remove the finished multi-material object (step 311).

Figure 4:
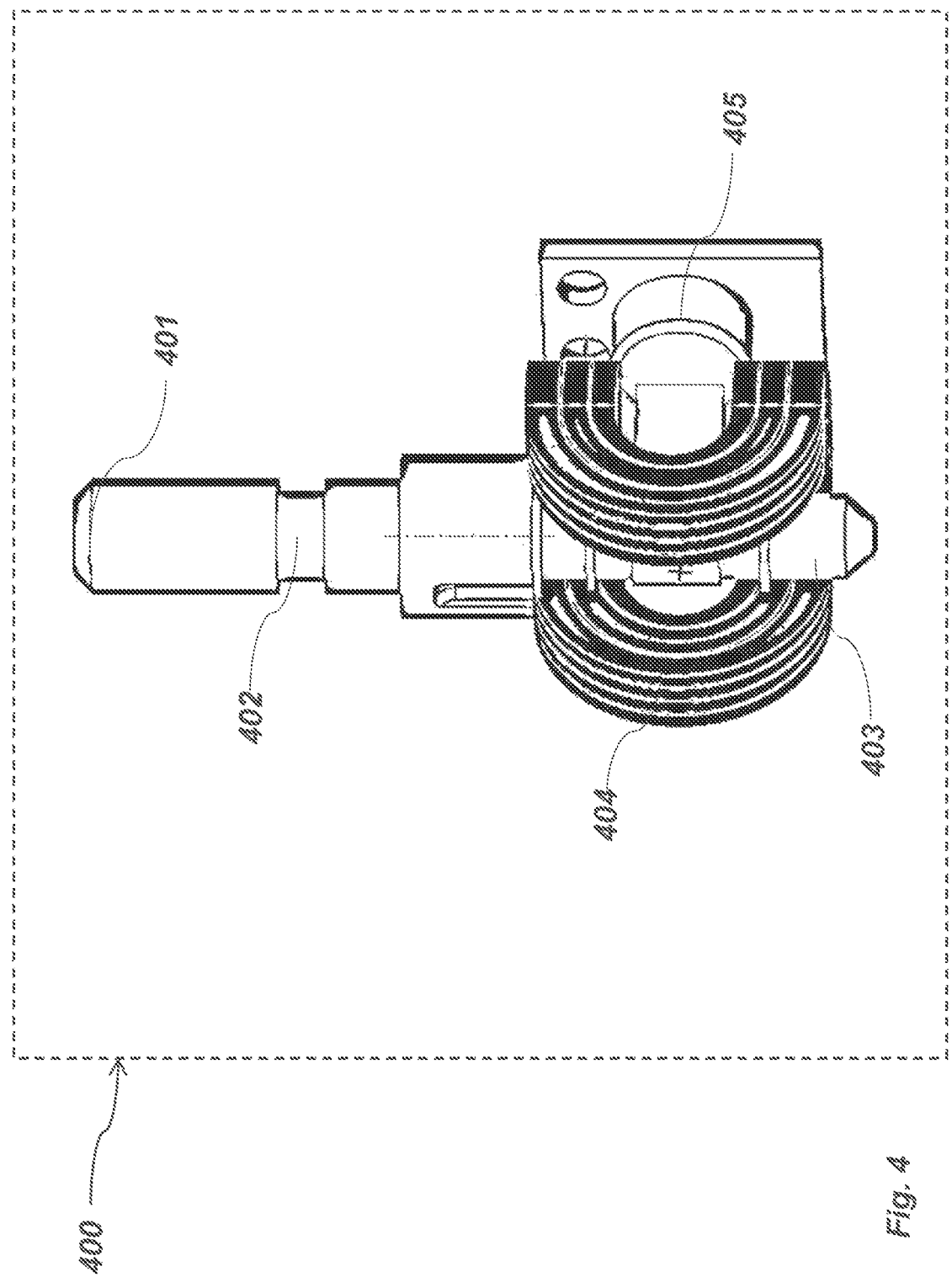
FIG. 4 depicts an arrangement of the passive nozzle and contactless induction heating element of the print head in accordance with the present invention.

FIG. 4 depicts a detailed view of the induction heating method with a passive micro-sized nozzle and induction heating element of the print head in accordance with the present invention. The passive micro-sized nozzle 402 comprises an entry point 401 for filament material at the top; a proximal end having nozzle fixation mechanical interface 402 and a nozzle tip 403 at the bottom. The nozzle fixation mechanical interface is configured for gripping nozzle. The heating element is made up of induction heating element 404. The print head unit (103/200) further comprises a heat sensor, which can be an infrared sensor 405. The nozzle fixation mechanical interface 402 is used for mating with print tool gripper. The nozzle tip 403 can be made up from inductive material, metallic material with magnetic, and/or has inductive response. The induction heating element 404 is an open coil induction heating coil for contactless heating of the passive micro-sized nozzle. The heating induction element 404 is used in a system with also the infrared sensor 405, which is used for measuring the temperature without contact and implementing a feedback loop for controlling the temperature.

Figure 5:
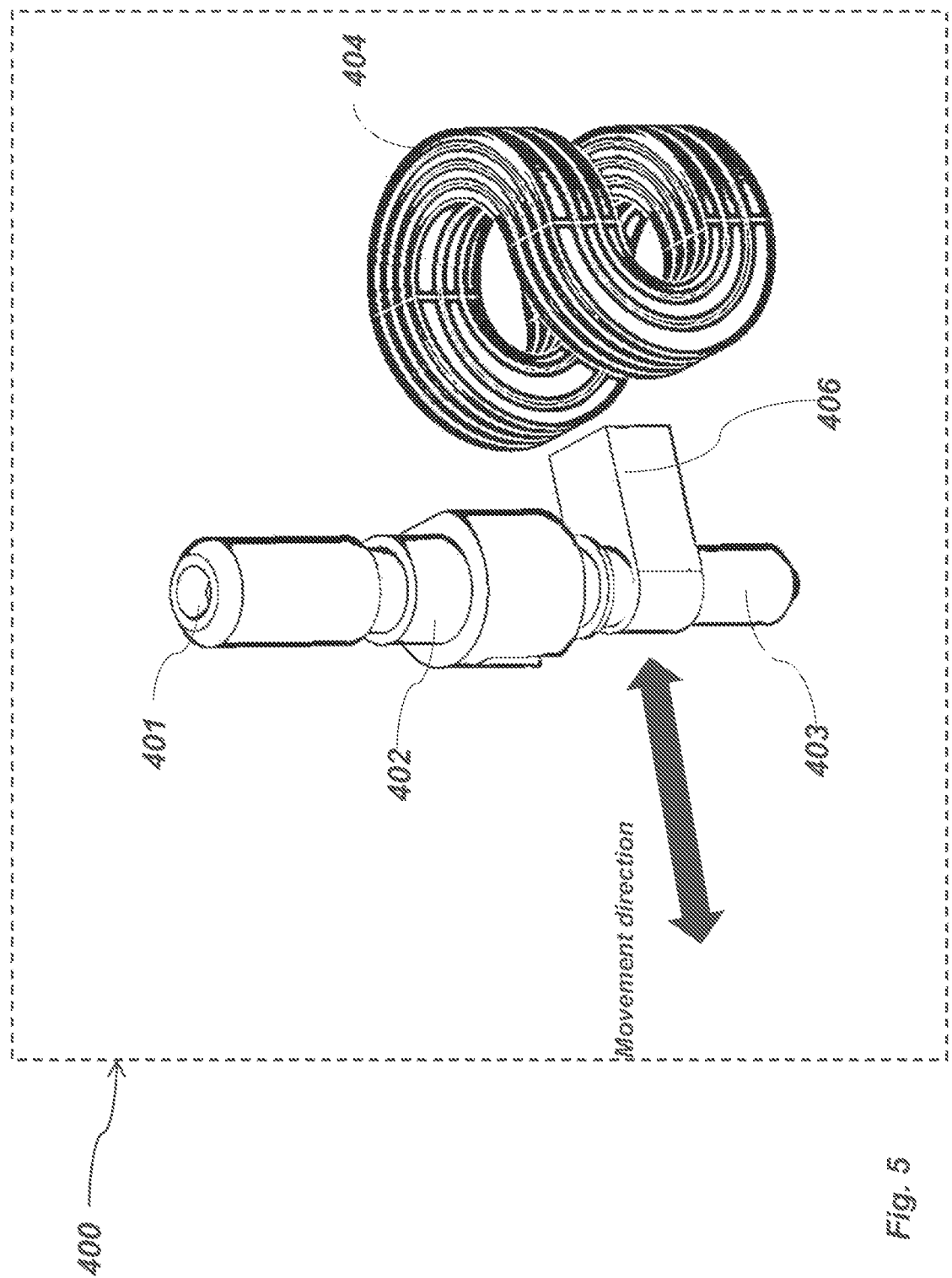
FIG. 5 depicts the geometry of the passive micro-sized nozzle to optimize the contactless induction heating function of the print head in accordance with the present invention.

FIG. 5 depicts the geometry of the passive micro-sized nozzle to optimize the induction heating function of the print head in accordance with the present invention. The arrangement is same as explained above for the FIG. 4. The nozzle tip 403 is made up of inductive material and the geometric shape is designed to optimize the inductive coupling to the induction coil 404. The passive micro-sized nozzle further comprises a surface 406, wherein said surface is positioned to allow temperature sensing between said sensor and said nozzle tip. The surface 406 is flat which allow accurate infrared sensing of the temperature of the nozzle tip 403.

Figure 6:
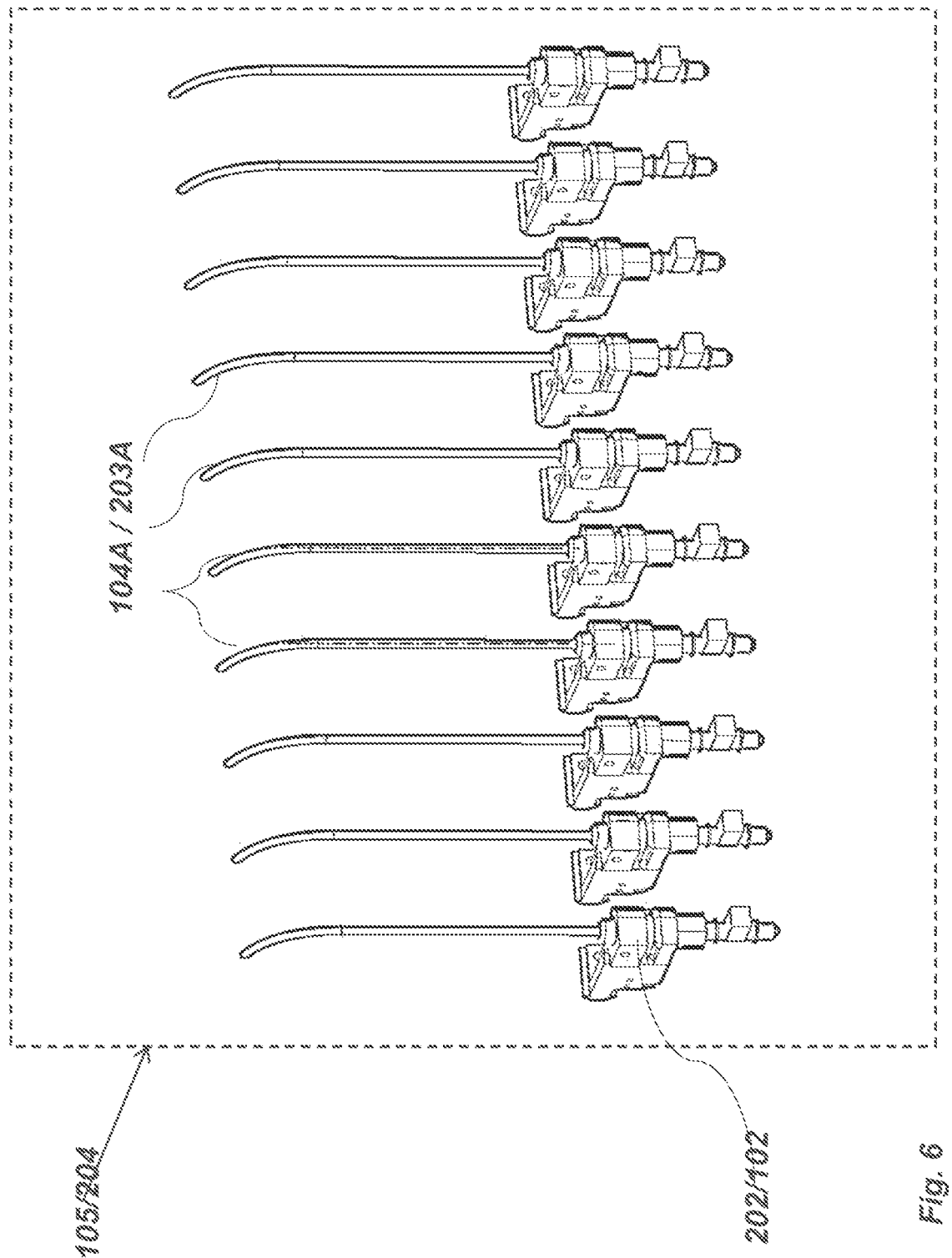
FIG. 6 depicts an arrangement of the rack of the passive micro-sized nozzle of the print head in accordance with the present invention.

FIG. 6 depicts a rack arrangement of the passive micro-sized nozzle in accordance with the present invention. The rack arrangement 105 of the passive micro-sized nozzle is depicted in the FIG. 6. The filaments 104A are pre-loaded into the individual passive micro-sized nozzles 202. The plurality of the passive micro-sized nozzles 102 are hold on the rack 105. The print head unit (200/103) can conveniently pick each passive micro-sized nozzle 202 from the rack and place them back when the layer printing is done.

Figure 7:
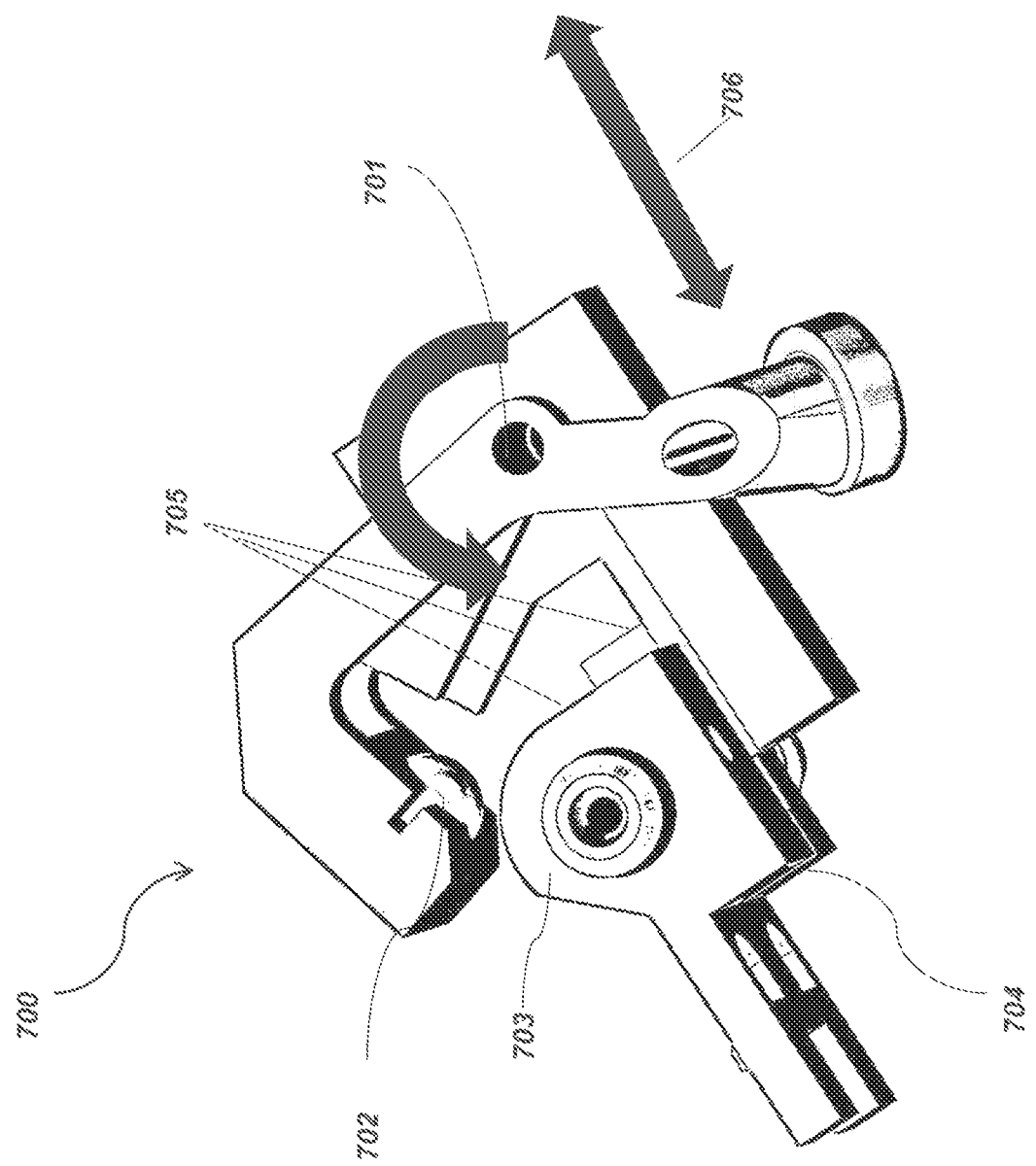
FIG. 7 depicts a detailed view of the function for gripping a passive nozzle in accordance with the present invention.

FIG. 7 depicts a detailed view of the function for gripping a passive micro-sized nozzle in accordance with the present invention. The nozzle gripper arm 700 comprises a mating surface 703, a fixating ball point 702, a plurality of fixating points 705, and a pivot point 701. The gripper arm 700 is integrated in the print head (not shown here) and will rotate around the pivot point 701. The gripper arm 700 includes a fixating ball point 702 which will engage with a mating surface 703 on the passive nozzle 704 after the passive nozzle 704 is placed against the other fixating points 705 by the movement of the print head depicted by the arrow 706. This enabled the passive nozzle 704 to be positioned in the same position in space every time is picked up.

Figure 8:
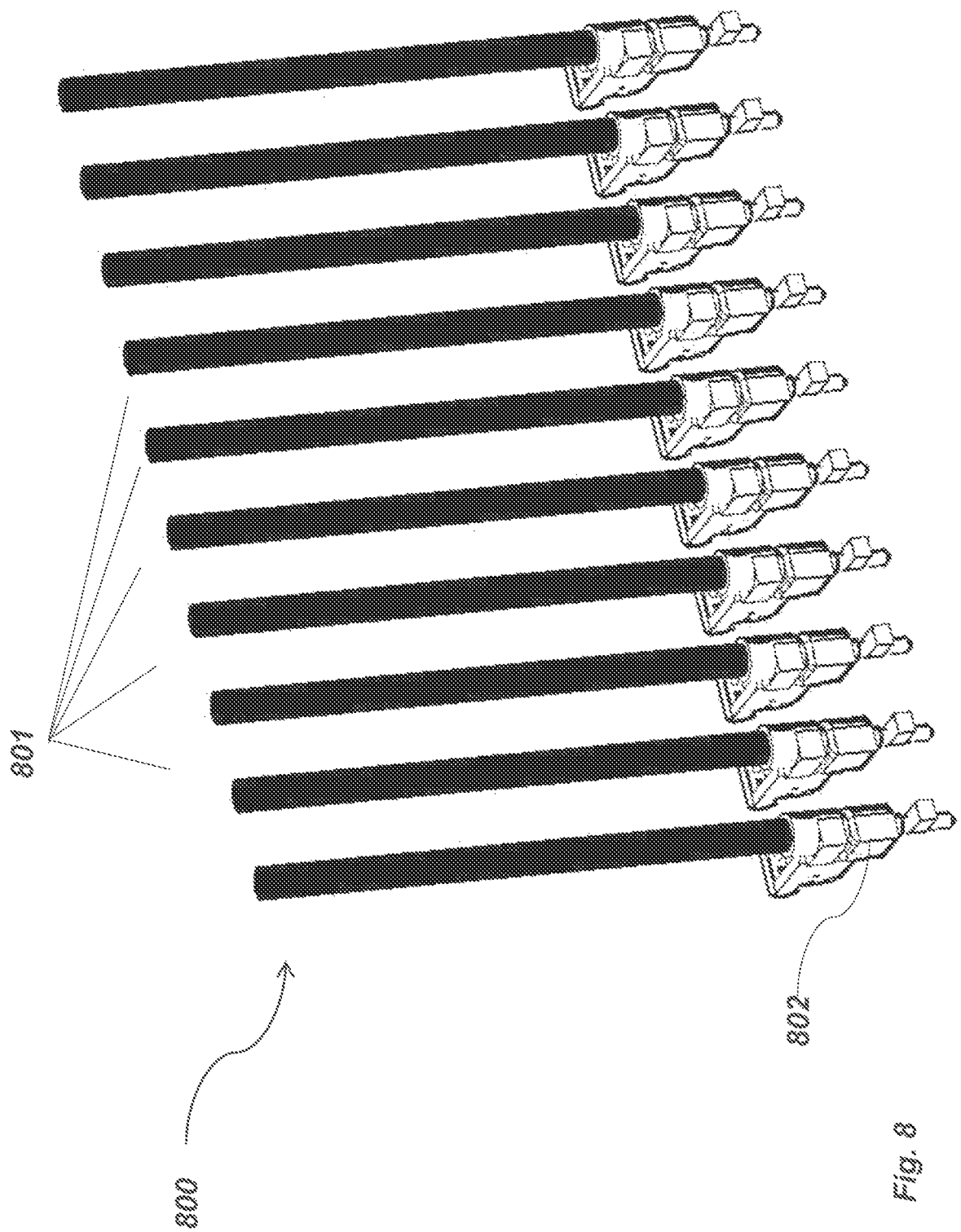
FIG. 8 depicts an arrangement of the rack of the passive micro-sized nozzles with material pre-loaded in the form of rods in accordance with the present invention.

In an embodiment of the present invention, it is possible to use the multi-material in the form of ROD instead of filament. FIG. 8 depicts an arrangement of the rack of the passive micro-sized nozzles with material pre-loaded in the form of rods in accordance with the present invention. The rods of multiple materials 801 are pre-loaded into the individual passive micro-sized nozzle 802 and are used instead of the filament supply 203. The plurality of the passive micro-sized nozzles 802 with rods 801 are place on the rack 204. The print head 200 can conveniently pick each passive micro-sized nozzle 802 from the rack and place them back when the layer printing is done. A rod 801 and a passive micro-sized nozzle 802 can in one embodiment of the present invention be integrated into a disposable unit where the disposable unit is disposed of after the rod material is used up, and replaced with a new unit. This eliminates the risk of issues due to wear and aging of the nozzle tip since the complete passive nozzle will be replaced periodically.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A three-dimensional printing apparatus for modeling a multi-material three-dimensional object on a layer-by-layer basis in accordance with a computer aided design (CAD) image of said object, comprising:
    a printer holding frame;
    a gantry motion system;
    a print head unit, wherein said print head unit is fixed on said gantry motion system;
    a feeder arrangement for supplying multiple filament materials;
    a rack arrangement for holding a plurality of passive micro-sized nozzles devoid of electrical connectors, wherein each passive micro-sized nozzle is pre-loaded with a material;
    a build platform on which said object is formed;
    wherein said print head unit comprises;
    a nozzle gripper mechanism for selectively picking holding and releasing one of said passive micro-sized nozzle from said plurality of passive micro-sized nozzles arranged on said rack arrangement,
    a filament or rod feeding mechanism arranged adjacent to and above said nozzle gripper mechanism for feeding the material into a selected said passive micro-sized nozzle held in said nozzle gripper mechanism, and
    a heating mechanism arranged adjacent to and below said nozzle gripper mechanism such that a lower portion of said selected passive micro-sized nozzle is exposed to a contactless heating element of the heating mechanism for contactless heating regulating of the lower portion of said selected passive micro-sized nozzle;

wherein said print head unit is configured to pick said passive micro-sized nozzle selectively from said rack arrangement for printing and to place back said passive micro-sized nozzle after printing.

2. The three-dimensional printing apparatus for modeling the multi-material three-dimensional object according to claim 1, wherein each passive micro-sized nozzle is configured to hold a filament or a rod of said material.

3. The three-dimensional printing apparatus for modeling the multi-material three-dimensional object according to claim 1, wherein said material is selected from the group of thermoplastic polymer materials.

4. The three-dimensional printing apparatus for modeling the multi-material three-dimensional object according to claim 1, wherein said passive micro-sized nozzle has an entry point for filament material at a top and a nozzle tip at a bottom portion of the passive micro-sized nozzle.

5. The three-dimensional printing apparatus for modeling the multi-material three-dimensional object according to claim 1, wherein a material for a nozzle tip is selected from the group consisting of inductive material and metallic material.

6. The three-dimensional printing apparatus for modeling the multi-material three-dimensional object according to claim 4, wherein said metallic material having a magnetic and/or inductive properties.

7. The three-dimensional printing apparatus for modeling the multi-material three-dimensional object according to claim 1, wherein said passive micro-sized nozzle is pre-loaded with one type of material in the form of filament or rod.

8. The three-dimensional printing apparatus for modeling the multi-material three-dimensional object according to claim 1, wherein said nozzle gripper mechanism comprises a nozzle gripper arm, a release arm, and a release motor.

9. The three-dimensional printing apparatus for modeling the multi-material three-dimensional object according to claim 8, wherein said nozzle gripper arm comprises a mating surface, a fixating ball point, a plurality of fixating points, and a pivot point.

10. The three-dimensional printing apparatus for modeling the multi-material three-dimensional object according to claim 1, wherein said filament or rod feeding mechanism comprises a filament feeder pressure arm, a filament feeder wheel, and a filament feeder motor.

11. The three-dimensional printing apparatus for modeling the multi-material three-dimensional object according to claim 1, wherein said heating mechanism comprises a heating element and a sensor.

12. The three-dimensional printing apparatus for modeling the multi-material three-dimensional object according to claim 10, wherein said heating element is an induction heating element.

13. The three-dimensional printing apparatus for modeling the multi-material three-dimensional object according to claim 10, wherein said heating mechanism further comprises a contactless heat sensor.

14. The three-dimensional printing apparatus for modeling the multi-material three-dimensional object according to claim 10, wherein said heating mechanism further comprises an infrared contactless heat sensor.

15. The three-dimensional printing apparatus for modeling the multi-material three-dimensional object according to claim 1, wherein said passive micro-sized nozzle comprises a proximal end having a nozzle fixation mechanical interface.

16. The three-dimensional printing apparatus for modeling the multi-material three-dimensional object according to claim 1, wherein said passive micro-sized nozzle further comprises a surface, wherein said surface is positioned to allow temperature sensing between said sensor and said nozzle tip.

17. The three-dimensional printing apparatus for modeling the multi-material three-dimensional object according to claim 8, wherein said fixating ball point is configured to engage with said mating surface on said passive micro-sized nozzle after it is placed against said fixating points.

* * * * *